US006339712B1

(12) United States Patent
Toivola

(10) Patent No.: US 6,339,712 B1
(45) Date of Patent: Jan. 15, 2002

(54) METHOD AND DEVICE FOR RADIO COMMUNICATION

(75) Inventor: Peter Toivola, Partille (SE)

(73) Assignee: Telefonaktiebolaget LM Ericsson (publ)., Stockholm (SE)

( * ) Notice: Subject to any disclaimer, the term of this patent is extended or adjusted under 35 U.S.C. 154(b) by 0 days.

(21) Appl. No.: 09/359,640

(22) Filed: Jul. 26, 1999

(30) Foreign Application Priority Data

Jul. 27, 1998 (SE) ............................................ 9802625

(51) Int. Cl.[7] ............................ H04B 1/66; H04M 1/00

(52) U.S. Cl. ....................... 455/562; 455/101; 455/103; 342/363

(58) Field of Search ................................ 455/562, 101, 455/103, 501, 121, 561, 114, 115; 342/375, 361, 363–366

(56) References Cited

U.S. PATENT DOCUMENTS 4,314,250 A * 2/1982 Hanell et al. ............... 455/562
4,500,883 A * 2/1985 Gutleber ..................... 455/562
4,531,234 A 7/1985 Bell
4,918,684 A * 4/1990 Boschet et al. ............. 455/562
5,548,813 A * 8/1996 Charas et al. .............. 455/33.1
5,862,459 A * 1/1999 Charas ....................... 455/114
5,894,598 A * 4/1999 Shoki ......................... 455/562
5,959,579 A * 9/1999 Gladh ........................ 455/562

FOREIGN PATENT DOCUMENTS

WO 95/10862 4/1995
WO 98/09372 3/1998

* cited by examiner

*Primary Examiner*—Lee Nguyen
*Assistant Examiner*—Simon Nguyen
(74) *Attorney, Agent, or Firm*—Burns, Doane, Swecker & Mathis, L.L.P.

(57) ABSTRACT

In a method and a device for reduction of intermodulation distortion in radio communication systems, a signal, which is intended to be transmitted, is fed to an active antenna for transmission in a main lobe. The antenna includes a plurality of transmitter stages each of which is supplied with a partial signal and includes an input stage, an amplifier, an output stage and an antenna element. A first phase rotation of each partial signal is performed before each amplifier, and a second phase rotation of each partial signal is performed after each amplifier. The sum of the first phase rotation and the second phase rotation is chosen to a value which is constant, and the second phase rotation is chosen so that an intermodulation lobe which is transmitted from the antenna is controlled in a direction which deviates substantially from the direction of said main lobe.

13 Claims, 1 Drawing Sheet

METHOD AND DEVICE FOR RADIO COMMUNICATION

TECHNICAL FIELD

The present invention relates to a method for radio communication. The invention is intended in particular for use in radio transmitters, for example of the mobile-telephone system base-station type, for reduction of undesirable intermodulation distortion The invention also relates to a device for such radio communication.

BACKGROUND

In connection with radio communication, for example in a base station intended for a mobile telephone system, use is often made of an active array antenna for amplification and transmission of the radio signals generated by the base station. According to known art, such an active array antenna usually comprises one or more amplifiers for amplification of the signals in question and for feeding the amplified signals to a corresponding number of antenna elements which may be of, for example, the microstrip type or the dipole type. The antenna also comprises an electric circuit which is intended for distribution of the signal arriving from the base station among the respective amplifiers. The antenna elements can be arranged in a row, for example, or according to another geometrical pattern.

One problem that may arise in connection with previously known base stations with active array antennas is linked to the fact that they are usually intended to be installed in an outdoor environment which is exposed to interference from various transmitters in the vicinity, which in turn generate radio signals across a broad frequency range. When these signals are incident upon the amplifiers of another active antenna, distortion in the form of intermodulation products will be generated in the latter antenna on account of non-linearities in its amplifiers. These intermodulation products will then be retransmitted via the antenna This results in undesirable interference in the transmitter in question, which is of course a disadvantage with this type of antenna.

According to known art, the abovementioned problem can in principle be solved and the intermodulation distortion can be reduced by using an active antenna which comprises amplifiers which have a very high degree of linearity, that is to say at the output stages of each antenna amplifier. A disadvantage of this solution, however, is that it requires relatively high power consumption in the amplifiers concerned, which in turn results in relatively expensive amplifiers.

Another solution to the abovementioned problem is to filter the transmitted signals, to be precise by using band-pass filters which are positioned after each amplifier in the antenna. In this way, Intermodulation products lying outside the transmitted signal-and concerned can be attenuated The intermodulation products which, on the other hand, lie within the transmitted signal-band can be attenuated by arranging insulators at the outputs of the amplifiers. These insulators can then be adapted so that they attenuate the incident, interfering signal which is fed from the antenna elements to the amplifiers, while the transmitted signal going in the direction from the amplifiers to antenna elements is allowed to pass essentially without being attenuated.

A disadvantage of using the abovementioned methods involving filtering and insulation is that these methods increase the cost and the size of the antenna.

In principle, intermodulation products can also be reduced by positioning a given base station as far as possible from interfering radio transmitters in the vicinity. A disadvantage of this solution, however, is that this may conflict with specified requirements for the intended coverage of, for example, a mobile telephone system, and that it may increase the total number of base stations required to cover a given geographical area.

SUMMARY

The object of the present invention is to provide an improved method for radio communication, in particular for reduction of intermodulation distortion caused by signals which are incident upon an active array antenna.

The invention relates to a method for reduction of intermodulation distortion in radio communication, in which a signal, which is intended to be transmitted, is fed to an active antenna for transmission in a main lobe. The antenna comprises a plurality of transmitter stages, each of which is supplied with a partial signal and comprises an input stage, an amplifier, an output stage and an antenna element. The method according to the invention is comprises a first phase rotation of each partial signal before the respective amplifier and a second phase rotation of each partial signal after the respective amplifier. Furthermore, the sum of the first phase rotation and the second phase rotation is chosen to have a value which is constant. Moreover, said second phase rotation is chosen so that an intermodulation lobe which is transmitted from the antenna is controlled in a direction which deviates substantially from the direction of said main lobe.

The invention results in an important advantage by virtue of the fact that the main lobe in which the signals of tee antenna according to the invention are transmitted can be made free from intermodulation products caused by incident radio signals from other transmitters in the vicinity. This in turn leads to reduced requirements relating to such intermodulation, for example by virtue of reduced requirements relating to the use of filters and insulators for each amplifier. The invention also leads to reduced requirements with regard to the linearity of each amplifier.

BRIEF DESCRIPTION OF THE DRAWINGS

The invention will be explained in greater detail below with reference to a preferred exemplary embodiment and the appended drawings, in which.

DETAILED DESCRIPTION

The present invention is intended for radio communication, in particular in connection with mobile telephone systems, and aims to make possible a reduction of undesirable intermodulation distortion. According to an exemplary embodiment of the invention, which is shown diagrammatically in FIG. 1, the invention comprises a transmitter station intended for radio communication, suitably in the form of a base station 1 for a mobile telephone system. The base station 1 is in turn connected to an antenna 2 which is preferably of the active array-antenna type.

Figure 1:
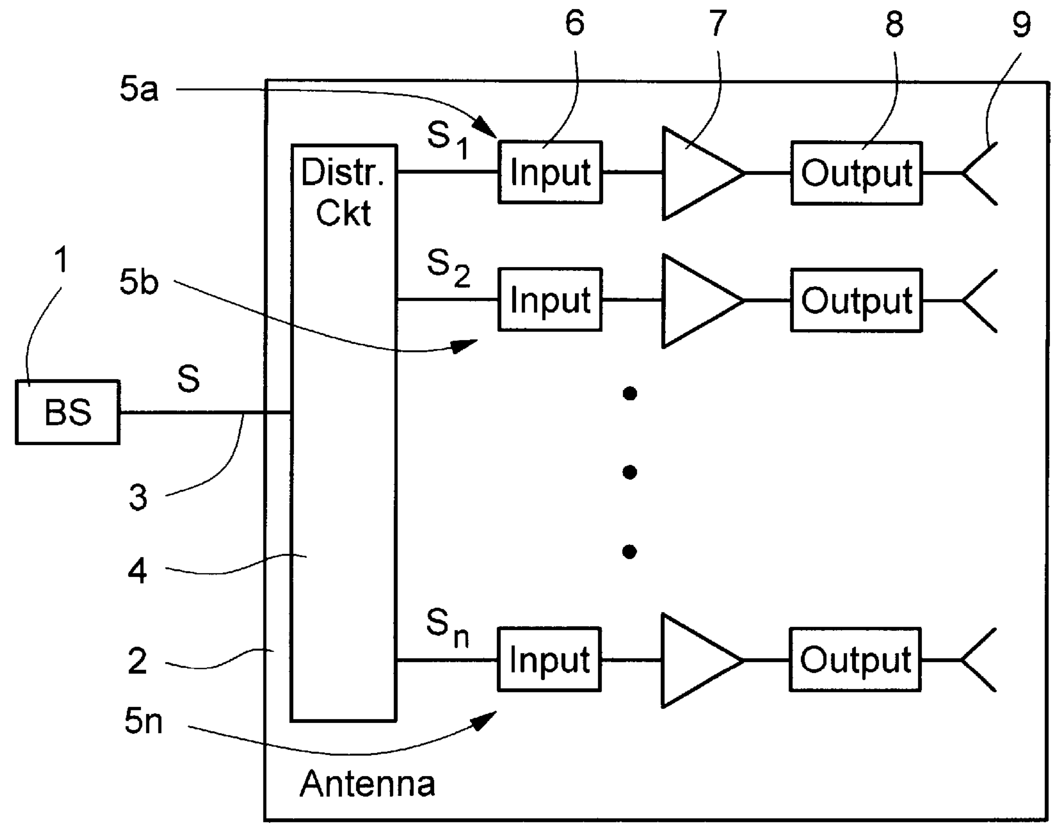
FIG. 1 shows in diagrammatic form an active array antenna designed according to the present invention.

A signal S, which is intended to be transmitted from the antenna 2, is fed from the base station 1 to the antenna 2 via a feeder cable 3. In this connection, this feeder cable 3 is connected to a distribution circuit 4 which forms part of the antenna 2 and by means of which the signal S is distributed among a predetermined number of transmitter stages which in FIG. 1 are shown in the form of a first transmitter stage 5*a*, a second transmitter stage 5*b* and an nth transmitter stage 5*n*. In this way, the signal S is divided into partial signals $S_1$, $S_2$, $S_n$ which are fed to the respective transmitter stages 5*a*, 5*b*, 5*n*.

The first transmitter stage 5*a* (like the other transmitter stages which form part of the antenna 2) comprises an input stage 6 to which the corresponding partial signal $S_1$ is fed. The partial signal $S_1$ is then fed to an amplifier 7 in which it is amplified. The amplified signal is then fed to an output stage 8 and then to an antenna element 9 from which it is transmitted. According to FIG. 1, it can be seen that the other transmitter stages 5*b*, 5*n* are constructed in a manner which corresponds to the explanation given above with reference to the first transmitter stage 5*a*.

The input stage 6 is adapted for phase rotation of the incoming partial signal $S_1$ by a given phase angle $\theta_{in}$. Furthermore, the output stage 8 is adapted to phase-rotate, by a given phase angle $\theta_{out}$, a signal amplified via the amplifier 7.

According to the detailed description below, it is a basic underlying principle of the invention that the phase rotation $\theta_{in}$ in each input stage 6 (that is to say the input stages forming part of each transmitter stage 5*a*, 5*b*, 5*n*) and the phase rotation $\theta_{out}$ in each output stage 8 (that is to say the output stages forming part of each transmitter stage 5*a*, 5*b*, 5*n*) are chosen so that the total phase rotation, that is to say the sum of the phase shift in each input stage and output stage, is the same in all the transmitter stages 5*a*, 5*b*, 5*n*. This can also be written as $$\theta_{in}+\theta_{out}=\text{constant}$$

with regard to all the transmitter stages 5*a*, 5*b*, 5*n* forming part of the antenna 2.

According to the invention, the antenna 2 is also adapted so that the phase shift $\theta_{out}$ with each output stage 8 is preferably given values increasing stepwise, to be precise so that $$\theta_{out}=n\cdot a+b$$

where n is a multiple which preferably corresponds to the ordinal of the transmitter stage of which the output stage concerned forms part, a is a predetermined constant and b is a further predetermined constant. In this way, the outgoing phase rotation in the first transmitter stage 5*a* is equal to a+b, the outgoing phase rotation in the second transmitter stage 5*b* is equal to 2a+b and the outgoing phase rotation in the nth transmitter stage 5*n* is equal to na+b.

Figure 2:
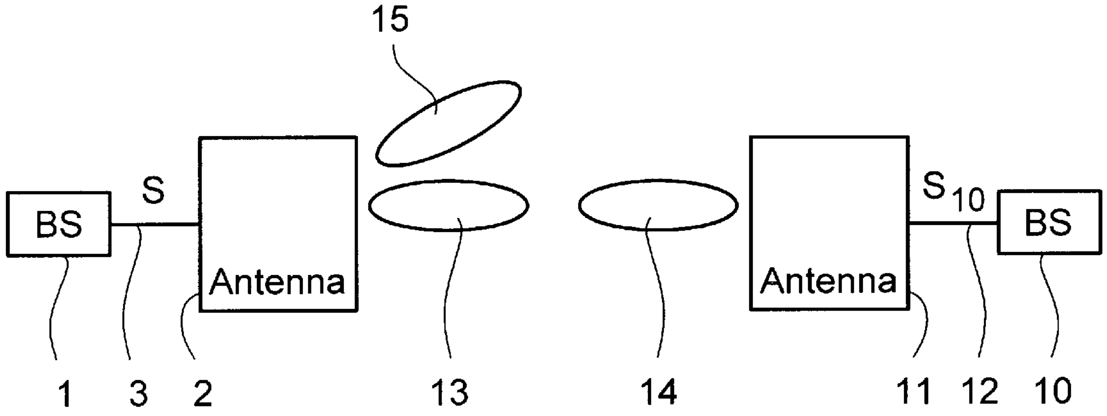
FIG. 2 shows in diagrammatic form a radio communication system in which the invention can be used.

The functioning of the invention will now be explained in detail and with reference to FIG. 2 which shows In diagrammatic form a radio communication system in which the invention can be used The figure shows the base station 1 described above and the active antenna 2 For the purpose of illustrating the functioning of the invention, it is assumed in this connection that the base station 1 is situated in the vicinity of a further base station 10, to which a second antenna 11 is connected via a second feeder cable 12. This means that radio radiation which is transmitted from the second base station 10 will be incident in the direction of the first station 1 and-will irradiate the latter.

The first base station 1 is adapted for transmission of the abovementioned signal S in a first main lobe 13 with a predetermined direction in relation to the second antenna 11. In a corresponding manner, the second base station 10 and the second antenna 11 are adapted for transmission of a further signal $S_{10}$ in a second main lobe 14 with a predetermined direction. For the purpose of describing the functioning of the invention, it is assumed that the second main lobe 14 is directed towards the first base station 1, as can be seen in FIG. 2.

During operation of the antenna 2 according to the invention in the vicinity of the second antenna 11, the first antenna 2 will be irradiated by radio signals from the second antenna 11. With reference to FIG. 1 and FIG. 2, some of these signals will be fed into each amplifier 7 of the first antenna 2 via the respective antenna element 9 (cf. FIG. 1). This usually results in distortion in the form of intermodulaton products being generated as a result of a certain degree of non-linearity in each amplifier 7. These intermodulation products will then be fed back and retransmitted via the first antenna 2.

The undesirable intermodulation distortion described above can be reduced considerably by means of the present invention by subjecting the signals $S_1$, $S_2$, $S_n$ in the respective transmitter stages 5*a*, 5*b*, 5*n* to the phase rotation $\theta_{in}$, $\theta_{out}$ described above before and after the respective amplifier 7. If, according to the invention, a gradually increasing phase rotation $\theta_{out}$ with each output stage 8 is moreover chosen, that is to say a phase rotation which for each transmitter stage satisfies the condition $\theta_{out}=n\cdot a+b$, the interfering signals from the second antenna 11 (cf. FIG. 2) which are received by the first antenna 2 will be subjected to a given phase rotation when they are fed in via the respective antenna elements 9 and output stages 8 and on to the respective amplifier 7. The intermodulation products generated in this way will thus pass back through the respective output stages 8 and then be phase-rotated again in connection with their being fed to the respective antenna element. Overall, this means that the signal S which is intended to be fed out via the first antenna 2 will maintain the direction of its main lobe 13, while the intermodulaton products which are also transmitted from the antenna 2 will have an intermodulation lobe 15 with a phase front which is phase-shifted by 2a degrees compared with the main lobe 13. This, in turn, results in it being possible to deflect the intermodulation lobe 15 in a direction which deviates from the direction of the main lobe 13, that is to say where it does not cause interference to the transmission by the first antenna 2.

According to the invention, the intermodulation lobe 15 can thus be deflected from the main lobe 13 which corresponds to the first signal S. This is advantageous because each amplifier 8 can be designed with reduced requirements with regard to low intermodulation and high linearity.

The abovementioned constant a is chosen primarily depending on the desired deflection angle for the intermodulation lobe 15 from the antenna 2 in relation to the expected resulting angle of the main lobe 14 of the second antenna 11.

For an interference signal which is incident at fight angles upon the first antenna 2, the intermodulation lobe 15 transmitted is also expected to be transmitted at right angles. With the invention, however, the intermodulaton lobe 15 transmitted can be deflected by 2a degrees from the expected direction at right angles. In this way, the intermodulation lobe 15 can be deflected in a direction where it causes minimal nuisance. In applications in the form of, for example, mobile telephone systems, it is often the case that the first antenna 2 (and the first main lobe 13) and also the second antenna 11 (and the second main lobe 14) are positioned at essentially the same height. In such cases, it is advantageous to deflect the intermodulation lobe 15 in the direction up towards the sky (that is to say 2a=90°), in which case minimal interference is obtained. In other types of radio communication system, however, other prerequisites may apply for, for example, the angle of incident interference signals and the desired angle of the intermodulation lobe 15.

The invention is not limited to the exemplary embodiments described above and shown in the drawings, but can be varied within the scope of the patent claims below. For example, the number of transmitter stages in the antenna 2 according to the invention may vary. It is also the case that the antenna elements 9 can be arranged geometrically in different ways and do not have to be restricted to being arranged in a row as shown in FIG. 1.

Furthermore, the invention is not limited to use in connection with mobile-telephone systems, but can be used in other radio communication systems where active matrix antennas are used.

The choice of the phase shift $\theta_{in}$ each input stage 6 and the phase shift $\theta_{out}$ in each output stage 8 can vary, for example depending on the antenna construction concerned. According to an alternative embodiment of the invention, said phase shifts can moreover be controlled so as to vary dynamically instead of being chosen to have fixed values. In the case of such dynamic control, each input stage 6 and each output stage 8 are adapted so that they can be monitored in a suitable manner so that the intermodulation lobe 15 can be deflected at a suitable angle depending on the application concerned.

Furthermore, the phase shift $\theta_{out}$ in each output stage 8 can be chosen in a way other than the linearly increasing distribution described above. For example, the phase shift $\theta_{out}$ can have the values+/−90° alternately. Other selections are also possible within the scope of the invention.

What is claimed is:

1. Method for reduction of intermodulation distortion in radio communication, in which a signal, which is intended to be transmitted, is fed to an active antenna for transmission in a main lobe, the antenna comprising a plurality of transmitter stages, each of which is supplied with a partial signal and comprises an input stage, an amplifier, an output stage and an antenna element, the method comprising:

performing a first phase rotation of each partial signal before the respective amplifier, performing a second phase rotation of each partial signal after the respective amplifier, choosing a sum of the first phase rotation and the second phase rotation to have a value which is constant, and choosing said second phase rotation so that an intermodulation lobe which is transmitted from the antenna is controlled in a predetermined direction which deviates substantially from the direction of said main lobe in a manner such that the chosen second phase rotation corresponds to a predetermined value of an angle of said predetermined direction with respect to the direction of said main lobe.

2. Method according to claim 1, wherein said second phase rotation is chosen to have values increasing stepwise with each transmitter stage.

3. Method according to claim 2, wherein said second phase rotation is chosen to have values which for each transmitter stage comprise the sum of a multiple of a first predetermined constant and a second predetermined constant.

4. Method according to claim 3, wherein said second phase rotation is chosen to have values where said multiple corresponds to the ordinal of the respective transmitter stage.

5. Method according to claim 1, wherein said value corresponding to said second phase rotation is chosen to be a fixed value which depends on a desired deflection of the angle of said predetermined direction with respect to an expected angle of said main lobe.

6. Method according to claim 1, wherein said values of said first phase rotation and said second phase rotation are dynamically varied by operating said input stage and said output stage depending on predetermined operating conditions of said antenna.

7. Device for reduction of intermodulation distortion in radio communication, comprising an active antenna for transmission of a signal in a main lobe, the active antenna comprising a plurality of transmitter stages, each of which is supplied with a partial signal and comprises an input stage, an output stage and an antenna element, wherein input stage is adapted for a first phase rotation of each partial signal, and each output stage is adapted for a second phase rotation of each partial signal, the input stages and the output stages being designed in such a manner that the sum of the first phase rotation and the second phase rotation has a value which is constant, and said second phase rotation being chosen so that an intermodulation lobe which is transmitted from the antenna is controlled in a predetermined direction which deviates substantially from the direction of said main lobe in a manner such that the chosen second phase rotation corresponds to a predetermined value of an angle of said predetermined direction with respect to the direction of said main lobe.

8. Device according to claim 7, wherein said output stage is designed so that said second phase rotation is given values increasing stepwise with each transmitter stage.

9. Device according to claim 7, wherein said value corresponding to said second phase rotation is chosen to be a fixed value which depends on a desired deflection of the angle of said predetermined direction with respect to an expected angle of said main lobe.

10. Device according to claim 7, wherein said values of said first phase rotation and said second phase rotation are dynamically varied by operating said input stage and said output stage depending on predetermined operating conditions of said antenna.

11. Mobile telephone system comprising at least one base station and, connected to the base station, a device for reduction of intermodulation distortion in radio communication, comprising an active antenna for transmission of a signal in a main lobe, the active antenna comprising a plurality of transmitter stages, each of which is supplied with a partial signal and comprises an input stage, an output stage and an antenna element, wherein each input stage is adapted for a first phase rotation of each partial signal, and each output stage is adapted for a second phase rotation of each partial signal, the input stages and the output stages being designed in such a manner that the sum of the first phase rotation and the second phase rotation has a value which is constant, and said second phase rotation being chosen so that an intermodulation lobe which is transmitted from the antenna is controlled in a predetermined direction which deviates substantially from the direction of said main lobe in a manner such that the chosen second phase rotation corresponds to a predetermined value of an angle of said predetermined direction with respect to the direction of said main lobe.

12. System according to claim 11, wherein said value corresponding to said second phase rotation is chosen to be a fixed value which depends on a desired deflection of the angle of said predetermined direction with respect to an expected angle of said main lobe.

13. System according to claim 11, wherein said values of said first phase rotation and said second phase rotation are dynamically varied by operating said input stage and said output stage depending on predetermined operating conditions of said antenna.

* * * * *